Dec. 17, 1929.  C. W. BECK  1,740,387
STEERING WHEEL
Filed April 30, 1928
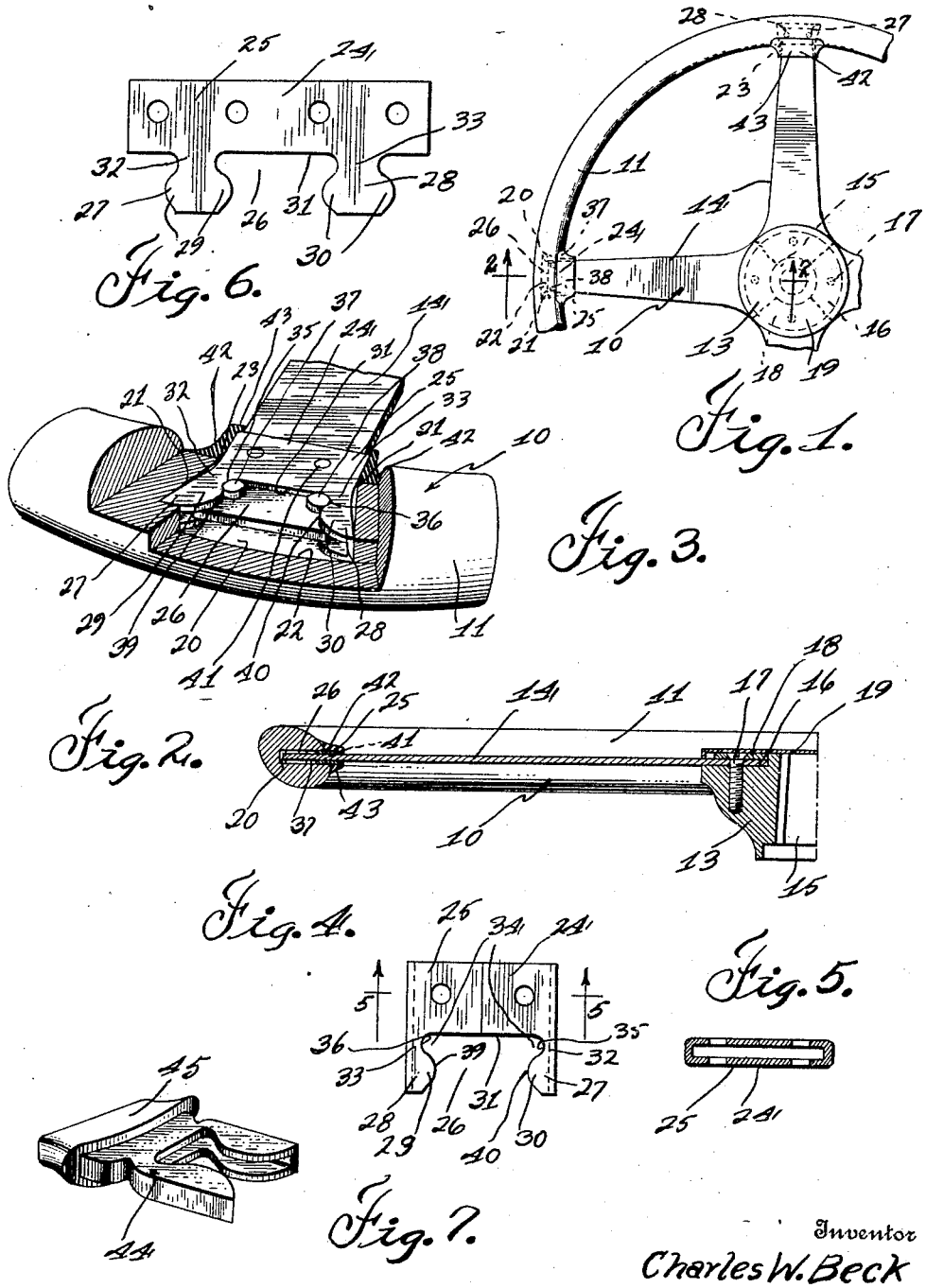
Inventor
Charles W. Beck Patented Dec. 17, 1929

1,740,387

UNITED STATES PATENT OFFICE

CHARLES W. BECK, OF TOLEDO, OHIO, ASSIGNOR TO BECK-FROST CORPORATION, OF DETROIT, MICHIGAN, A CORPORATION OF MICHIGAN

STEERING WHEEL

Application filed April 30, 1928. Serial No. 274,084.

This invention relates to steering wheels for motor vehicles and the like and more particularly to means for simplifying, rendering more efficient and improving generally the connection between the spider arms and wheel rim.

With the foregoing, as well as other objects in view, the invention resides in the specific details of construction illustrated and about to be described.

In the drawings:

Figure 1 is a plan view of a steering wheel embodying my invention;

Figure 2 is a fragmentary sectional view taken on the plane indicated by the line 2—2 of Figure 1;

Figure 3 is a detail perspective view showing the connection between the spider arms and wheel rim;

Figure 4 is a detail plan view of the attaching clip;

Figure 5 is a sectional view taken on the plane indicated by the line 5—5 of Figure 4;

Figure 6 is an elevation view showing the development of the member illustrated in Figure 3;

Figure 7 is a perspective view of a slightly modified form of attaching clip.

Referring now to the drawing wherein like reference characters designate corresponding parts throughout the several views, it will be noted that there is illustrated a steering wheel 10 comprising a rim 11 and a spider 12. The latter is formed entirely of metal and comprises a hub portion 13 and a plurality of radially extending arms 14. The hub portion 13 is preferably a casting and is provided with a central bore 15 for receiving the usual steering column (not shown) of a vehicle, while the arms 14 are preferably pressed from sheet metal to a desired substantially flat bar shape and have their inner ends resting within an annular recess 16 formed in the hub portion 13. As shown, the inner ends of the arms are preferably secured within the annular recess 16 by means of the screws 17, which project through the annular plate 18 disposed within the recess 16 and having a bearing engagement with the top surfaces of the arms. If desired, a suitable plate 19 may be provided for concealing the ring 18 and securing means 17.

In the present instance, the outer ends of the arms 14 project into suitable slots 20 formed in the inner surface of the rim. Preferably the side walls 21 of the slots are tapered toward the center of the rim rendering the base 22 of the slots substantially wider than the opening 23 in the inner surface of the rim 11. Sleeved upon the outer ends of the arms 14 are the members 24 which, as shown in Figure 6 of the drawing may be developed from a single sheet of metal and comprise the body portions 25 cut away, as indicated at 26, to form laterally projecting fingers 27 and 28, the latter having arcuate inwardly projecting portions 29 and 30 spaced from the lower edges 31 of the body portions 25 and connected thereto by means of shank portions 32 and 33, the inner edges of the shank portions being curved outwardly from the edges 31 in such a manner as to form a reverse curve with the inwardly projecting portions 29 and 30. As will be understood from Figure 3 of the drawing, the extreme inner edges of the arcuate portions 29 and 30 are spaced a substantial distance inwardly from the radii 34 for the curves 35 and 36 of the shank portions. Projecting laterally from the opposite sides of each of the arms 14 adjacent the ends thereof, are a pair of pins 37 and 38. The particular position of the pins upon the arms is accurately determined and the diameter thereof is so selected that when the sleeve-like members 24 are moved to their final position upon the arms 14, as illustrated in Figure 3, the pins will engage the inner curved edges 35 and 36 of the shank portions 32 and 33 and the fingers will be flexed outwardly into intimate contact with the tapered side walls 21 of the slots.

In assembling the parts heretofore set forth, the members 24 are sleeved upon the ends of the arms 14 and the pins 37 and 38 are pressed in their proper position within the ends of the arms. The latter are then projected within the slots 20 formed in the rim and the members 24 are moved radially outwardly to engage the inclined edges 39 and 40 of the arcuate portions 27 and 28 with the pins 37 and 38. Upon continued outward movement of the members 24, the pins will ride along the edges 39 and 40 and force the fingers 27 and 28 outward until the pins engage the curved inner surfaces 35 and 36 of the shank portions, at which time the fingers will assume a position adjacent the side walls 21 of the slots 20 and owing to the direction of taper of the side walls, the fingers will form a locking engagement therewith. As will be understood from Figure 3 of the drawing, the fingers 27 and 28 will be prevented from inward movement by means of the pins 37 and 38. After the members 24 are in the position heretofore pointed out, the same are secured to the arms, as indicated at 41. In order to conceal the securing means 41 and the joint between the arms and rim, the members 42 are provided. These members are preferably carried by the arms and are provided with the body portions 43 adapted to surround the body portions 25 of the members 24, the outer ends of the members 42 being shaped to accurately fit or embrace the rim and form a neat joint therewith.

Thus from the foregoing description it will be readily apparent that I have provided exceptionally strong and durable connections between the spider arms and rim and that such connections may be readily and comparatively inexpensively made.

In Figure 7 a slightly modified form of attaching member 44 is illustrated. The only material difference between this form and the members 24 being that the former is formed of a casting instead of a stamping and is provided with an enlarged head portion 45 which functions in substantially the same manner as the members 42 in the first described form of the invention. In both forms of the invention heretofore set forth, the securing means for the attaching members, such as illustrated at 41, may be dispensed with owing to the fact that when the pins 37 and 38 are in the position illustrated in Figure 3, they will prevent relative movement between the spokes and attaching members.

While it is believed that from the foregoing description, the nature and advantage of my invention will be readily apparent, I desire to have it understood that I do not limit myself to what is herein shown and described and that such changes may be resorted to when desired as fall within the scope of the accompanying claims.

What I claim as my invention is:

1. In a steering wheel, the combination with a wheel rim and a spider arm, of a connection between said rim and arm including a part sleeved upon said arm and having interlocking engagement with said rim.

2. In a steering wheel, the combination with a wheel rim and a spider arm, of a connection between said rim and arm including a part sleeved upon said arm and projecting into said rim having an interlocking engagement with the latter.

3. In a steering wheel, the combination with a wheel rim and a spider arm, of a connection between said rim and arm including a part carried by said arm, and means also carried by said arm engageable with portions of said part to guide the said portions into locking engagement with the rim.

4. In a steering wheel, the combination with a wheel rim having a recess therein, of a spider arm projecting into said recess, a connection between said rim and arm including a part carried by the arm and having portions thereof engageable in said slot and means operable upon movement of said part into the slot to flex the portions aforesaid outwardly into locking engagement with the walls of the slot.

5. In a steering wheel, the combination with a wheel rim and a spider arm, of a connection between said rim and arm including a part sleeved upon said arm having flexible end portions adapted to project into said slot, abutments carried by said arm operable upon movement of the part into said recess to flex the end portions thereof outwardly into locking engagement with the side walls of said recess, and means for rigidly securing the said part upon the arm with the end portions thereof in interlocking engagement with the rim.

6. In a steering wheel, the combination with a wheel rim and a spider arm, of a connection between said rim and arm including a part sleeved upon the arm and having laterally projecting flexible fingers engageable in a slot formed in said rim, and means operable upon movement of said fingers in said slot to engage the latter and flex the same laterally outwardly into locking engagement with the side walls of the slot.

7. In a steering wheel, the combination with a wheel rim and a spider arm, of a connection between said rim and arm including a part sleeved upon said arm and terminating at one end in spaced laterally projecting fingers having inwardly extending arcuate surfaces, said fingers adapted to project into a slot formed in said rim, and means operable upon movement of said fingers into said slot to engage the arcuate surfaces aforesaid and flex the fingers laterally outwardly into locking engagement with the side walls of said slot.

8. In a steering wheel, the combination with a wheel rim and a spider arm, of a connection between said rim and arm including a part slidably mounted upon said arm and terminating at one end in spaced laterally projecting fingers having arcuate inwardly projecting surfaces adapted to project into a slot formed in said rim, and abutments carried by said arm adjacent the side edges thereof operable upon movement of said fingers into said slot to engage the inner arcuate surfaces aforesaid of the fingers and flex the latter outwardly into locking engagement with opposite side walls of the slot.

9. In a steering wheel, the combination with a wheel rim having a slot therein provided with tapered side walls, of a spider arm projecting into said slot, a connection between said arm and rim including a part carried by the arm and movable into said slot, and means operable upon movement of said part into the slot to flex portions of the part outwardly into wedging engagement with the tapered walls of the slot.

10. In a steering wheel, the combination with a wheel rim having a slot therein provided with tapered side walls, of a spider arm projecting into said slot, a connection between said arm and rim including a part slidably mounted upon the arm and movable into said slot, common means operable upon movement of said part into the slot to flex portions of the part laterally outwardly into wedging engagement with the tapered walls aforesaid of the slot and for holding the end portions in flexed position, and means for rigidly securing the said part in position upon the arm.

11. In a steering wheel, the combination with a spider arm, of a rim having a recess receiving a portion of said arm, and a part sleeved on said arm and having lateral portions engaging certain walls of said recess.

12. In a steering wheel, the combination with a rim having a recess, of a spider arm having a portion in said recess, a part carried by said arm having lateral portions engaging certain walls of said recess, and means also carried by said arm maintaining said lateral portions in engagement with said recess walls.

In testimony whereof I affix my signature.

CHARLES W. BECK.